US012592444B2

(12) United States Patent
Fuchs et al.

(10) Patent No.: US 12,592,444 B2
(45) Date of Patent: Mar. 31, 2026

(54) HOLDING DEVICE FOR BATTERY CELLS

(71) Applicant: Bayerische Motoren Werke Aktiengesellschaft, Munich (DE)

(72) Inventors: Franz Fuchs, Munich (DE); Kevin Gallagher, Naperville, IL (US); Martin Hiller, Karlsfeld (DE); Christophe Mille, Villard de Lans (FR); Frederik Morgenstern, Mountain View, CA (US); Nikolaos Tsiouvaras, Athen (GR); Seokyoon Yoo, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 676 days.

(21) Appl. No.: 17/916,161

(22) PCT Filed: Apr. 28, 2021

(86) PCT No.: PCT/EP2021/061039
§ 371 (c)(1),
(2) Date: Sep. 30, 2022

(87) PCT Pub. No.: WO2021/239363
PCT Pub. Date: Dec. 2, 2021

(65) Prior Publication Data
US 2023/0163401 A1 May 25, 2023

(30) Foreign Application Priority Data

May 28, 2020 (DE) ..................... 10 2020 114 262.5

(51) Int. Cl.
*H01M 50/291* (2021.01)
*H01M 10/613* (2014.01)
(Continued)

(52) U.S. Cl.
CPC ....... *H01M 50/291* (2021.01); *H01M 10/613* (2015.04); *H01M 10/625* (2015.04);
(Continued)

(58) Field of Classification Search
CPC ............ H01M 50/291; H01M 50/213; H01M 50/249; H01M 50/289; H01M 50/20;
(Continued)

(56) References Cited

U.S. PATENT DOCUMENTS

2012/0094157 A1 4/2012 Seto
2016/0118633 A1 4/2016 Hongo et al.
(Continued)

FOREIGN PATENT DOCUMENTS

CN 107615564 A 1/2018
CN 110574221 A 12/2019
(Continued)

OTHER PUBLICATIONS

International Search Report (PCT/ISA/210) issued in PCT Application No. PCT/EP2021/061039 dated Aug. 2, 2021 with English translation (four (4) pages).
(Continued)

*Primary Examiner* — Eugenia Wang
(74) *Attorney, Agent, or Firm* — Crowell & Moring LLP

(57) ABSTRACT

A holding device for battery cells forming a high-voltage module that can be used for electrically driven motor vehicles includes an insulation plate provided with a pattern of recesses for each of the battery cells, the pattern of recesses includes positioning supports for the battery cell and flow grooves for an electrically insulating adhesive mass to be introduced.

10 Claims, 1 Drawing Sheet

(51) Int. Cl.

| | |
|---|---|
| *H01M 10/625* | (2014.01) |
| *H01M 10/653* | (2014.01) |
| *H01M 10/6554* | (2014.01) |
| *H01M 50/213* | (2021.01) |
| *H01M 50/249* | (2021.01) |
| *H01M 50/289* | (2021.01) |

(52) U.S. Cl.
CPC ..... *H01M 10/653* (2015.04); *H01M 10/6554* (2015.04); *H01M 50/213* (2021.01); *H01M 50/249* (2021.01); *H01M 50/289* (2021.01); *H01M 2220/20* (2013.01)

(58) Field of Classification Search
CPC ............. H01M 50/262; H01M 10/613; H01M 10/625; H01M 10/653; H01M 10/6554; H01M 50/258; H01M 50/60; H01M 2220/20; Y02E 60/10
See application file for complete search history.

(56) References Cited

U.S. PATENT DOCUMENTS

| | | | |
|---|---|---|---|
| 2017/0125756 A1 | 5/2017 | Nietling et al. | |
| 2018/0175464 A1 | 6/2018 | Kim et al. | |
| 2020/0194853 A1* | 6/2020 | Yoo ..................... | H01M 10/613 |

FOREIGN PATENT DOCUMENTS

| | | | | |
|---|---|---|---|---|
| DE | 10 2015 013 800 A1 | 4/2016 | | |
| DE | 11 2015 001 861 T5 | 3/2017 | | |
| DE | 10 2016 206 463 A1 | 10/2017 | | |
| EP | 3 654 444 A1 | 5/2020 | | |
| JP | 2016-207494 A | 12/2016 | | |
| WO | WO-2019083177 A1 * | 5/2019 | .......... | H01M 10/613 |

OTHER PUBLICATIONS

German-language Written Opinion (PCT/ISA/237) issued in PCT Application No. PCT/EP2021/061039 dated Aug. 2, 2021 (seven (7) pages).

German-language Search Report issued in German Application No. 10 2020 114 262.5 dated Jan. 29, 2021 with partial English translation (11 pages).

Chinese-language Office Action issued in Chinese Application No. 202180019226.4 dated Mar. 28, 2025 with English translation (12 pages).

Chinese-language Office Action issued in Chinese Application No. 202180019226.4 dated Jul. 26, 2025, with English translation (13 pages).

* cited by examiner

HOLDING DEVICE FOR BATTERY CELLS

BACKGROUND AND SUMMARY OF THE INVENTION

The present invention relates to a holding device for battery cells, a plurality of which are installed together to form a battery module of a high-voltage storage device, in particular for an electric vehicle or for a hybrid vehicle.

To provide electric energy, storage batteries, also referred to as batteries or accumulators, are known. Electric energy with a comparatively high voltage, for example 400 V, is required to supply electric drives of vehicles, and the storage batteries used for this are also referred to as high-voltage storage devices or drive batteries. Nowadays, high-voltage storage devices of this type are not generally constructed as monoblocks, but from a plurality of battery cells in a modular structure. This increases the design flexibility and enables the use of comparatively cost-effective standard cells, which may be manufactured as mass-produced products, instead of individual custom products. The number of battery cells used is in direct correlation with the range of the electric or hybrid vehicles. In practice, for example, round cells or prismatic battery cells are used as battery cells for the high-voltage storage devices.

Furthermore, the high-voltage storage devices are often installed in the region of the passenger compartment or the trunk of a vehicle and take up considerable space. Therefore, a challenge associated with accommodating the high-voltage storage device is to find a configuration whereby the passenger comfort and storage space are restricted as little as possible. Therefore, the aim is to use those spaces which otherwise have no further use to accommodate the battery cells, where possible, whilst achieving a high packing density of the battery cells. Such a holding device is known, for example, from DE 10 2016 206 463 A1, which is formed in particular by a plastic frame for insertion into the clearances between the battery cells.

The object of the present invention consists in providing a holding device for battery cells which reduces costs and requires less installation space.

The object is achieved by the claimed invention.

The invention relates to a holding device for battery cells for constructing a high-voltage storage device module which can be used for electrically operated motor vehicles, which holding device comprises an insulating plate provided with a recess pattern for each battery cell, wherein the recess pattern comprises both positioning supports for the battery cell and flow grooves for the introduction of an electrically insulating adhesive.

The invention is based on the following considerations:

Known holding devices for battery cells are usually complex plug-in devices. When constructing a module from a plurality of battery cells, these should be protected from overheating by cooling plates. In this case, the battery cells should be electrically insulated from the cooling plates.

According to embodiments of the invention, by way of simplification, an electrically insulating adhesive and a specially configured insulating plate shall firstly be used as a holder whereby reliable positioning, in particular with respect to the vertical axis, shall be realized. Furthermore, during the manufacturing process, the highest possible adhesive force must be established between the battery cells and the cooling plate. The adhesive must flow evenly and without air bubbles. The mechanical connection strength and the dissipation of heat shall thus be optimized.

Therefore, the holding device according to embodiments of the invention substantially comprises an insulating plate provided with a recess pattern for each battery cell, wherein the recess pattern comprises both positioning supports for the battery cell and flow grooves for the introduction of an adhesive. The positioning supports prevent contact between the battery cell and the cooling plate and therefore also have an electrically insulating effect. The flow grooves are configured in such a way that they enable the cavity to be at least completely filled with electrically insulating adhesive between the battery-cell surface, which lies on the positioning support, and the cooling plate. However, the flow grooves preferably also enable at least partial lateral support, as seen along the vertical axis. In this case, the application is particularly advantageous for round batteries, but is not restricted thereto.

The invention will be described below with the aid of a preferred exemplary embodiment and with reference to the accompanying figures. The illustration in the figures should be seen as purely schematic.

DETAILED DESCRIPTION OF THE DRAWINGS

Figure 1:
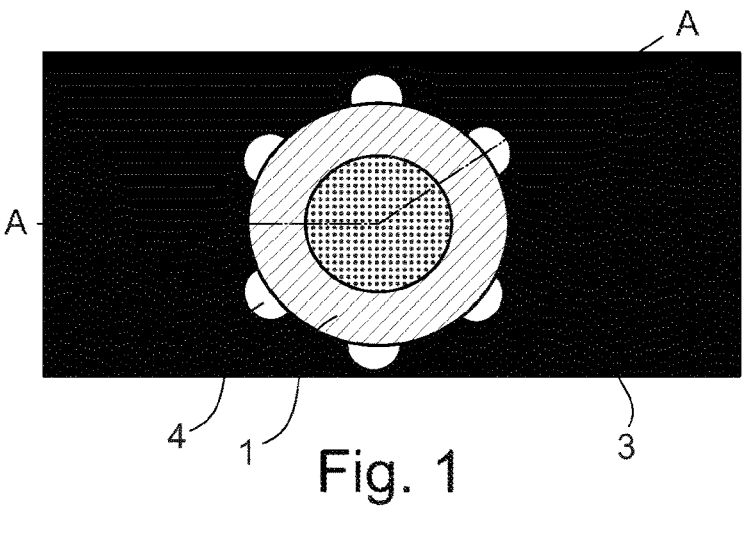
FIG. 1 shows a plan view of the overall arrangement according to an embodiment of the invention, holding a battery cell.

FIG. 1 shows a battery cell 1 in an insulating plate 3 (detail) provided with a recess pattern. In FIG. 1, seen from above, only the flow grooves 4 for the introduction of an adhesive 6 (FIG. 2) can be seen.

Figure 2:
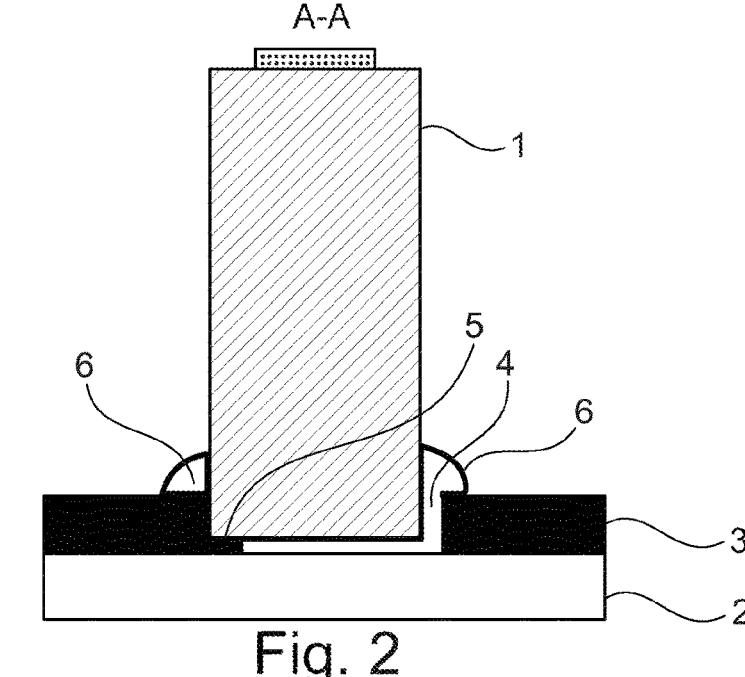
FIG. 2 shows a cross-section of FIG. 1 through the vertical axis (z axis) with a 120° angle (section A-A).

FIG. 2 shows FIG. 1 as seen in the section A-A. The battery cell 1 is seated on a positioning support 5 of the insulating mat 3 and is therefore spaced from a cooling plate 2 provided below the insulating mat 3. The positioning supports 5 are therefore configured in such a way that contact between the battery cell 1 and the cooling plate 2 is prevented.

In FIG. 2, a flow groove 4 can moreover be seen, which is configured so as to ensure that the cavity between the battery cells 1, which lie on the positioning support 5, and the cooling plate 2 is completely filled with adhesive 6. The chosen adhesive should be electrically insulating.

Figure 3:
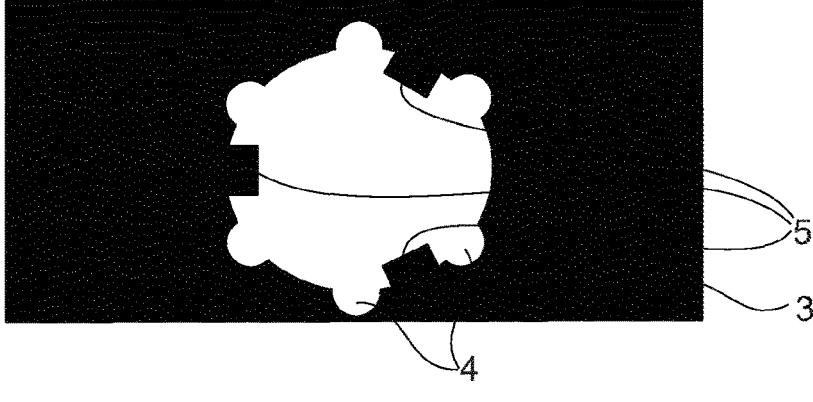
FIG. 3 shows a plan view of the recess pattern according to an embodiment of the invention in the insulating plate, without a battery cell.

FIG. 3 shows all positioning supports 5 (3 here, in the case of a round cell form) and all flow grooves 4 (6 here, in the case of a round cell form).

The flow grooves 4 are formed as evenly distributed knob-shaped recesses, so that it is possible for the adhesive 6 to escape in a laterally supporting manner.

The positioning supports 5 are (integrally) formed in the insulating plate 3 as uniformly distributed depressions in the form of spacers.

The number of flow grooves 4 here is double the number of positioning supports 5. Each positioning support 5 may be directly adjacent to every second flow groove 4.

The invention claimed is:

1. A holding device for a plurality of battery cells for a storage device module which is usable in electrically operated motor vehicles, the holding device comprising:

an insulating plate provided with a recess pattern for a battery cell of the plurality of battery cells, wherein the recess pattern comprises an opening in the insulating plate into which the battery cell of the plurality of battery cells is inserted, positioning supports for the battery cell of the plurality of battery cells, and flow grooves for introduction of an adhesive, and wherein the flow grooves extend continuously from the opening in the insulating plate.

2. The holding device according to claim 1, wherein the positioning supports are configured such that contact between the battery cell of the plurality of battery cells and a cooling plate is prevented.

3. The holding device according to claim 2, wherein the flow grooves are configured to ensure that a cavity between the battery cell of the plurality of battery cells, which lies on the positioning supports, and the cooling plate is completely filled with the adhesive.

4. The holding device according to claim 1, wherein the flow grooves are formed as evenly distributed knob-shaped recesses in the insulating plate.

5. The holding device according to claim 1, wherein the positioning supports are formed in the insulating plate as evenly distributed depressions in a form of spacers between the battery cell of the plurality of battery cells and a cooling plate.

6. The holding device according to claim 1, wherein a number of the flow grooves is a multiple of a number of the positioning supports, and the multiple is at least 2.

7. The holding device according to claim 1, wherein the positioning supports and the flow grooves are arranged alternately in the recess pattern in equal numbers.

8. The holding device according to claim 1, wherein each positioning support is directly adjacent to one of the flow grooves.

9. The holding device according to claim 1, wherein the adhesive is introduced via the flow grooves with an excess which contributes to lateral support.

10. A vehicle comprising a storage device, which comprises the holding device according to claim 1.

* * * * *